US012059909B2

(12) United States Patent
Yamaguchi

(10) Patent No.: US 12,059,909 B2
(45) Date of Patent: Aug. 13, 2024

(54) LIQUID DISCHARGING DEVICE AND METHOD OF READING TEST PATTERN IMAGE BY LIQUID DISCHARGING DEVICE

(71) Applicant: Seiko Epson Corporation, Tokyo (JP)

(72) Inventor: Kenji Yamaguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 405 days.

(21) Appl. No.: 17/310,421

(22) PCT Filed: Nov. 22, 2019

(86) PCT No.: PCT/JP2019/045842

§ 371 (c)(1),
(2) Date: Mar. 25, 2022

(87) PCT Pub. No.: WO2020/161991

PCT Pub. Date: Aug. 13, 2020

(65) Prior Publication Data

US 2022/0258509 A1 Aug. 18, 2022

(30) Foreign Application Priority Data

Feb. 5, 2019 (JP) ................................ 2019-018689

(51) Int. Cl.
*B41J 29/393* (2006.01)

(52) U.S. Cl.
CPC .................................. *B41J 29/393* (2013.01)

(58) Field of Classification Search
CPC .. B41J 29/393; B41J 2/16508; B41J 2/16526; B41J 19/145; B41J 25/3082; B41J 29/38; B41J 29/17
See application file for complete search history.

(56) References Cited

U.S. PATENT DOCUMENTS 6,832,824 B1 12/2004 Baker et al.
2005/0093904 A1 5/2005 Ishimoto et al.

FOREIGN PATENT DOCUMENTS

JP 06-297728 10/1994
JP 2005-047024 2/2005
(Continued)

OTHER PUBLICATIONS

Machine Translation of JP 2016150486 A to Izumio, Seiji, "Liquid Discharge and Method of Controlling the Same", Aug. 22, 2016, [see Description of Embodiments] (Year: 2022).*
(Continued)

*Primary Examiner* — Lisa Solomon
(74) *Attorney, Agent, or Firm* — WORKMAN NYDEGGER

(57) ABSTRACT

A liquid discharging device includes a support unit configured to support a medium, a discharging unit configured to discharge liquid to the medium, a reading unit configured to read an image formed on the medium with the liquid, a holding unit configured to hold the discharging unit and the reading unit while moving in a scanning direction, and a control unit configured to control operation of the discharging unit, the reading unit, and the holding unit. The control unit is configured to perform pattern forming operation that causes the discharging unit to discharge the liquid to form a test pattern image on the medium, reading operation that causes the reading unit to read at least a partial region of the test pattern image, and flushing operation that causes the discharging unit to perform flushing for discharging the liquid to the region in the test pattern image which was read.

7 Claims, 12 Drawing Sheets

(56) References Cited

FOREIGN PATENT DOCUMENTS

| | | | | |
|---|---|---|---|---|
| JP | 2006-198988 | | | 8/2006 |
| JP | 2006198988 | A | * | 8/2006 |
| JP | 2009-286141 | | | 12/2009 |
| JP | 2011-177949 | | | 9/2011 |
| JP | 2013-205258 | | | 10/2013 |
| JP | 2014-034141 | | | 2/2014 |
| JP | 2016-150486 | | | 8/2016 |
| JP | 2016150486 | A | * | 8/2016 |
| JP | 2017-127978 | | | 7/2017 |

OTHER PUBLICATIONS

Machine Translation of JP 2006198988 A to Aoki, Katsumi et al. “Inkjet Recorder”, Aug. 3, 2006, [see Abstrat, Avantageous-Effects, Tech Solution] (Year: 2006).*

* cited by examiner

LIQUID DISCHARGING DEVICE AND METHOD OF READING TEST PATTERN IMAGE BY LIQUID DISCHARGING DEVICE

CROSS-REFERENCE TO RELATED APPLICATIONS

The present application is a 371 US Nationalization of International Patent Application No. PCT/JP2019/045842, filed Nov. 22, 2019, which claims priority to Japanese Patent Application No. 2019-018689, filed Feb. 5, 2019, the entire disclosures of which are incorporated by reference herein.

TECHNICAL FIELD

The present disclosure relates to a liquid discharging device.

BACKGROUND ART

For example, PTL 1 described below discloses a printing apparatus that forms an image on a printed body by discharging ink from a discharging head while scanning a carriage on which the discharging head is mounted, as a liquid discharging device. The printing apparatus of PTL 1 detects density of a correction pattern, which is a kind of a test pattern image formed by discharging ink from the discharging head, by an optical sensor mounted on the carriage, and corrects the deviation of the ink landing position on the basis of the detection result.

CITATION LIST

Patent Literature

PTL 1: JP-A-2009-286141

SUMMARY OF INVENTION

Technical Problem

As in the printing apparatus of Patent Document 1, in a liquid discharging device in which a reading unit configured to read the test pattern image is held and moved by a common holding unit together with a discharging unit configured to discharge the liquid, the discharging unit is located on the test pattern image while the reading unit reads the test pattern image. As a result, depending on the reading time of the test pattern image, the liquid may dry at the nozzle of the discharging unit and may clog the nozzle.

As a method of suppressing clogging of the nozzle in the discharging unit, flushing for discharging the liquid from the discharging unit at a location away from a medium which is the target of the liquid discharge, is typically known. However, when the reading unit is moved to a location away from the test pattern image together with the discharging unit for the flushing of the discharging unit while reading the test pattern image, the processing time for reading the test pattern image increases.

Such a problem is not limited to printing apparatuses, but is a common problem in the liquid discharging device in which both the discharging unit that discharges the liquid and the reading unit that reads the test pattern image are held together by the holding unit that moves in the scanning direction.

Solution to Problem

One aspect of the technique of the present disclosure is provided as a liquid discharging device. A liquid discharging device of this aspect includes a support unit configured to support a medium, a discharging unit configured to discharge liquid to the medium supported by the support unit, a reading unit configured to read an image formed on the medium with the liquid, a holding unit configured to hold the discharging unit and the reading unit while moving in a scanning direction, and a control unit configured to control operation of the discharging unit, the reading unit, and the holding unit. The control unit is configured to perform pattern forming operation that causes the discharging unit to discharge the liquid to form a test pattern image on the medium, reading operation that causes the reading unit to read at least a partial region of the test pattern image, and flushing operation that causes the discharging unit to perform flushing for discharging the liquid to a region in the teat pattern image read by the reading unit.

DESCRIPTION OF EMBODIMENTS

1. First Exemplary Embodiment

Figure 1:
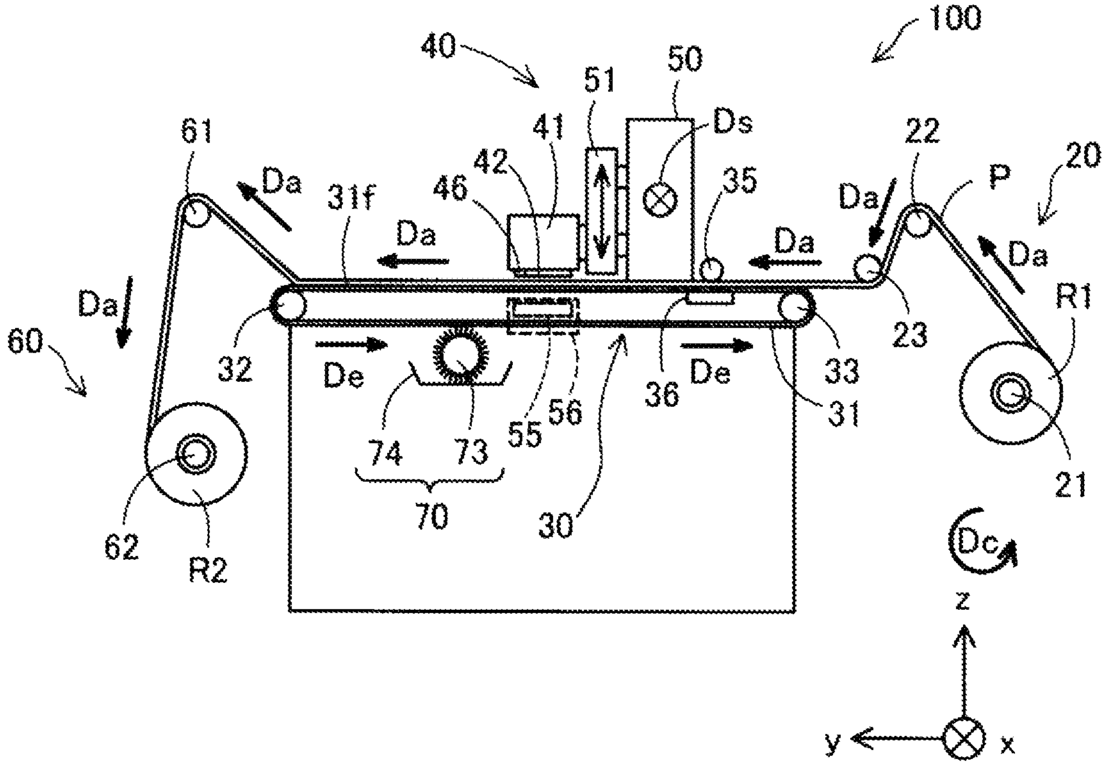
FIG. 1 is a schematic view illustrating a configuration of a liquid discharging device.

FIG. 1 is a schematic view of a liquid discharging device 100 according to a first exemplary embodiment when viewed from the right side. In FIG. 1, the left side of the paper surface corresponds to the front side of the liquid discharging device 100, and the right side of the paper surface corresponds to the rear side thereof. FIG. 1 illustrates an x-axis, a y-axis, and a z-axis indicating three directions orthogonal to each other. The x-axis direction is a direction from the right side to the left side of the liquid discharging device 100, the y-axis direction is a direction from the rear side to the front side of the liquid discharging device 100, and the z-axis direction is a vertically upward direction. The x, y, and z-axes illustrated in the other figures which are referred to later also indicate the same directions as in FIG. 1.

In the first exemplary embodiment, the liquid discharging device 100 is a so-called ink jet printer configured to discharge liquid ink onto a medium P to form an image based on the print data. An example of the kind of the medium P will be described later. The liquid discharging device 100 includes a feeding unit 20, a support unit 30, a discharge processing unit 40, a winding unit 60, and a cleaning unit 70.

The feeding unit 20 has a mechanism that feeds out the medium P in a strip shape from a roll R1. The feeding unit 20 rotates the roll R1 set on a rotation shaft 21, and feeds the medium P to the support unit 30 via driven rollers 22 and 23. When the medium P is fed out to the support unit 30, the rotation shaft 21 rotates in a rotation direction Dc.

The support unit 30 has a mechanism that supports the medium P. In the first exemplary embodiment, the support unit 30 is configured as a transport mechanism that transports the medium P in a transport direction Da by a transporting belt 31. In the first exemplary embodiment, the transport direction Da is the longitudinal direction of the medium P.

In the first exemplary embodiment, the transporting belt 31 is an endless belt. The support unit 30 includes a driving roller 32 and a driven roller 33, and the transporting belt 31 is stretched along the y-axis between the driving roller 32 and the driven roller 33. The support unit 30 transports the medium P in the transport direction Da by rotating the transporting belt 31 in the rotation direction Dc by the driving roller 32. The support unit 30 can also rotate the transporting belt 31 in the reverse direction to retract the medium P in the direction opposite to the transport direction Da.

On a surface of the transporting belt 31, an adhesive layer for attaching the medium P to a support face 31*f* of the transporting belt 31 is formed. However, as the transporting belt 31, a belt other than an adhesive belt may be used, and for example, an electrostatic adsorption-type belt may be used.

In addition to the transporting belt 31, the driving roller 32, and the driven roller 33, the support unit 30 includes a pressing roller 35 and a belt support unit 36. The driving roller 32 rotates in the rotation direction Dc when transporting the medium P. The medium P is attached to the surface of the transporting belt 31 by being pressed against the support face 31*f* of the transporting belt 31 between the pressing roller 35 and the belt support unit 36. The pressing roller 35 is configured to reciprocate in the transport direction Da and the reverse direction thereof in order to suppress contact marks on the medium P by contacting with the same place of the medium P for a certain period of time.

The discharge processing unit 40 has a mechanism that discharges liquid onto the medium P supported by the support unit 30 to form an image. The discharge processing unit 40 includes a holding unit 41, a discharging unit 42, a reading unit 46, a scanning driving unit 50, a cap unit 55, and a liquid receiving unit 56.

The holding unit 41 is a member also called a carriage, and holds the discharging unit 42 and the reading unit 46. The holding unit 41 is arranged above an arrangement region of the medium P in the support unit 30, that is, above a transport path of the medium P. The holding unit 41 is held by the scanning driving unit 50 and moves in a scanning direction Ds or the reverse direction thereof by the scanning driving unit 50.

The discharging unit 42 has a mechanism that discharges liquid, and is constituted by a printing head described below. The discharging unit 42 is provided on a lower surface of the holding unit 41 facing the region where the medium P is arranged. A plurality of nozzles that discharge the liquid are arranged on the lower surface of the discharging unit 42. Configuration examples of the discharging unit 42 will be described later.

The reading unit 46 has a mechanism that reads an image formed on a printing surface of the medium P. As used herein, "reading an image" means capturing the image itself or detecting information about components of the image by optical measures. "Components of an image" means, for example, pixels such as ink dots, and graphics, patterns, colors, densities, and the like formed thereby. In the first exemplary embodiment, the reading unit 46 includes a camera configured to capture an image formed on the printing surface of the medium P. The reading unit 46 is attached to the lower surface of the holding unit 41 facing the region where the medium P is arranged so that the reading unit 46 can read the printing surface of the medium P. An example of the attachment position of the reading unit 46 in the holding unit 41 will be described later. In the liquid discharging device 100, in a test pattern reading process described later, the reading unit 46 reads a test pattern image formed on the medium P with the liquid discharged by the discharging unit 42.

The scanning driving unit 50 has a mechanism that moves the holding unit 41 in the scanning direction Ds or the reverse direction thereof in order to scan the discharging unit 42 and the reading unit 46 above the printing surface of the medium P. "Scan" means moving along the surface of an object in order to perform processing on the object. The scanning direction Ds is a direction that intersects the transport direction Da of the medium P below the holding unit 41. In the first exemplary embodiment, the transport direction Da of the medium P below the holding unit 41 is the y-axis direction, and the scanning direction Ds is a width direction of the medium P and the x-axis direction. The transport direction Da may be defined in a direction opposite to the y-axis direction, and the scanning direction Ds may be defined in a direction opposite to the x-axis direction.

Hereinafter, the scanning direction Ds is also referred to as a "forward direction", and the reverse direction thereof is also referred to as a "return direction". In the liquid discharging device 100, an image is formed on the printing surface of the medium P by discharging liquid from the discharging unit 42 while moving the holding unit 41 in the forward direction or the return direction. Forming an image while moving the holding unit 41 in the forward direction is referred to as "forward printing", and forming the image while moving the holding unit 41 in the return direction is referred to as "return printing". At the time of printing, the liquid is discharged from the discharging unit 42 while the holding unit 41 is moved, but the support unit 30 stops the transport of the medium P while the holding unit 41 is moving. In other words, at the time of printing, scanning of the forward path or the return path of the holding unit 41, and the transport of the medium P are performed alternately.

The scanning driving unit 50 includes a gap adjustment mechanism 51. The gap adjustment mechanism 51 is a mechanism that changes the position of the holding unit 41 in the z-axis direction. In the first exemplary embodiment, the gap adjusting mechanism 51 employs a cam mechanism, and the holding unit 41 can be moved along the z-axis direction by rotating the cam. In the discharge processing unit 40, a gap between the lower surface of the holding unit 41 and the medium P is adjusted by the gap adjustment mechanism 51.

The cap unit 55 is installed on the side of the transport path of the medium P below the holding unit 41. Specifically, the cap unit 55 is installed on the back side in the x-axis direction with respect to the transporting belt 31. In FIG. 1, for convenience, the installation position of the cap unit 55 is illustrated by a dashed line. The cap unit 55 is configured so that all the nozzles of the discharging unit 42 can be airtightly closed. Normally, the discharging unit 42 is moved above the cap unit 55 and pressed against the cap unit 55 by the scanning driving unit 50 while the printing or the test pattern reading process described later is not performed. As a result, the nozzle of the discharging unit 42 is airtightly sealed, and the liquid in the nozzle is prevented from drying while printing is not being performed.

The liquid receiving unit 56 is installed between the cap unit 55 and the transport path of the medium P. Specifically, the liquid receiving unit 56 is installed on the back side in the x-axis direction with respect to the transporting belt 31, and between the cap unit 55 and the transporting belt 31. In FIG. 1, for convenience, the installation position of the liquid receiving unit 56 is illustrated by a dashed line. The liquid receiving unit 56 is a member that receives liquid discharged from the discharging unit 42 when the discharging unit 42 performs flushing. "Flushing" means operation of discharging liquid from the discharging unit 42, not for the purpose of forming an image, but of suppressing nozzle clogging of the discharging unit 42. In the flushing, basically, the liquid is discharged from all the nozzles used for forming the image in the discharging unit 42. However, in the flushing, the liquid may be discharged from a part of the nozzles in the discharging unit 42. In the liquid discharging device 100, in a scene other than the test pattern reading process described later, the discharging unit 42 is moved above the liquid receiving unit 56 by the scanning driving unit 50, and then flushing is performed.

The winding unit 60 has a mechanism that winds the medium P after the image has been formed thereon. The winding unit 60 includes a driven roller 61 and a winding shaft 62. A paper tube for winding is set on the winding shaft 62, and the medium P transported from the support unit 30 via the driven roller 61 can be wound as a roll R2.

The cleaning unit 70 has a mechanism that cleans the support face 31*f* of the transporting belt 31 after the medium P has been collected. The cleaning unit 70 is provided downstream of the discharge processing unit 40 and the winding unit 60 in the transport direction Da of the medium P. In the first exemplary embodiment, the cleaning unit 70 is installed below the transporting belt 31 and cleans the support face 31*f* of the transporting belt 31 which is transported in a turning direction De opposite to the transport direction Da of the medium P.

The cleaning unit 70 has a cleaning brush 73 that contacts the support face 31*f* of the transporting belt 31 and a tray 74 containing cleaning fluid for cleaning the cleaning brush 73. As the cleaning brush 73 rotates, the support face 31*f* of the transporting belt 31 is rubbed and cleaned by the cleaning brush 73, and the cleaning brush 73 itself is cleaned in the tray 74. The cleaning unit 70 can remove the liquid that has exuded to the back surface of the medium P and attached to the support face 31*f* due to printing, and the liquid that has attached to the support face 31*f* in a region protruding from the medium P. In the first exemplary embodiment, water is used as the cleaning liquid. However, liquid other than water may be used as the cleaning liquid. For example, liquid containing a predetermined cleaning component may be used as the cleaning liquid.

Here, an example of a kind of the medium P will be described. In the liquid discharging device 100, as the medium P, a printing-target material may be used. The printing-target material refers to a subject of printing, such as fiber, garments, and other cloth products. Fiber includes woven cloth, knit fabric, and non-woven cloth, for example, made of natural fiber such as cotton, hemp, silk, and wool, of chemical fiber such as nylon, and of composite fiber of natural fiber and chemical fiber. Garments and other cloth products include fabricated products, such as a T-shirt, handkerchief, scarf, towel, handbag, fabric bag, and furniture-related products including a curtain, sheet, and bed cover, as well as include fiber before and after cutting to serve as parts before fabrication. In addition to the printing-target materials described above, the medium P may be special paper for ink-jet printing, such as plain paper, pure paper, and glossy paper. Other materials that can be used as the medium P include, for example, plastic films without a surface treatment for ink-jet printing, that is, on which an ink absorption layer is not formed, as well as substrates such as paper having a plastic coating applied thereon and substrates such as paper having a plastic film bonded thereto. As described above, various materials can be used as the medium P, and the thickness of the medium P is also extensive. An operator of the liquid discharging device 100 can adjust the value of the gap between the lower surface of the discharging unit 42 and the medium P to an appropriate value suitable for the medium P, by using the gap adjustment mechanism 51.

Figure 2:
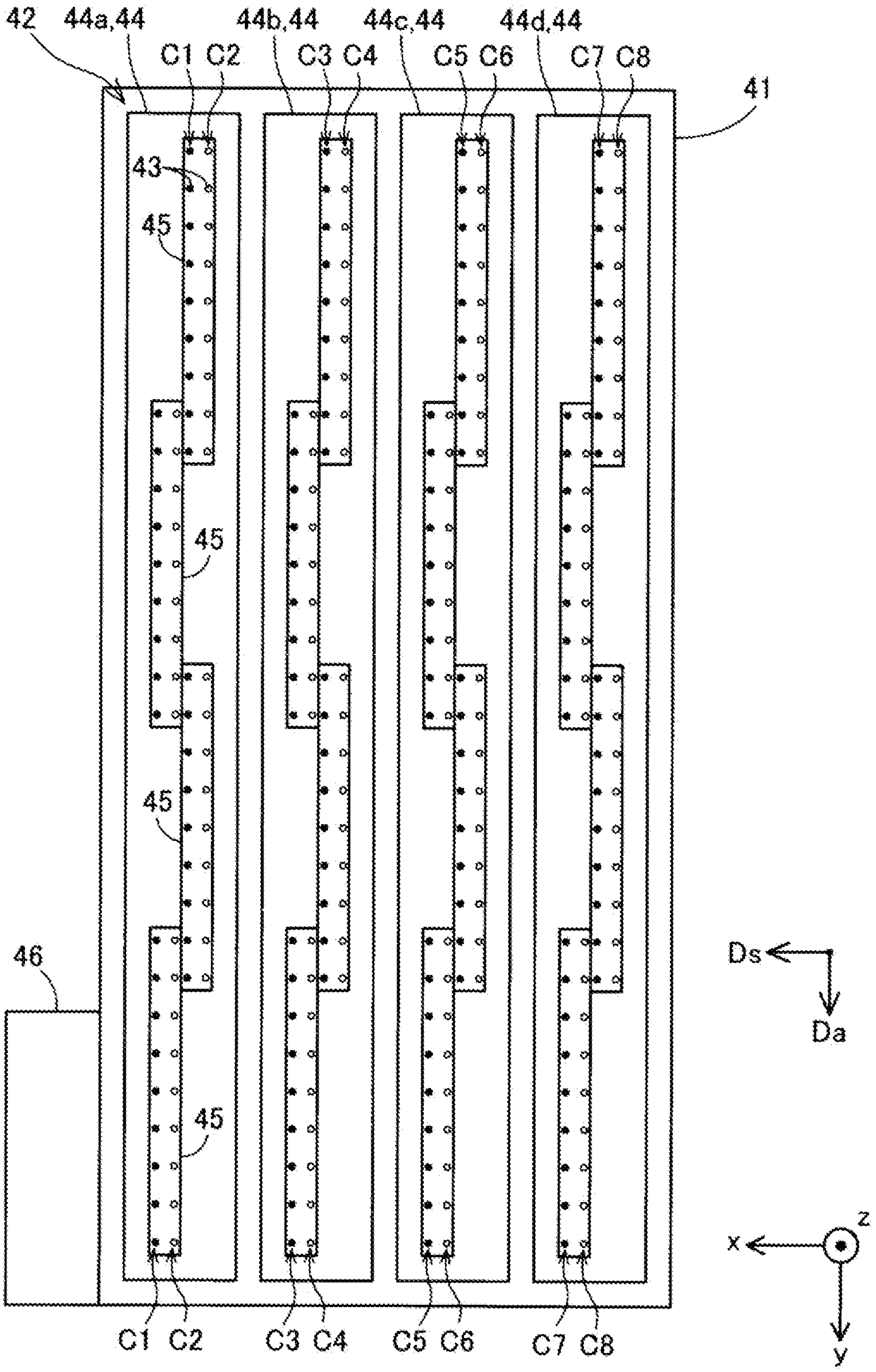
FIG. 2 is a schematic plan view illustrating a configuration of a holding unit.

FIG. 2 is a schematic plan view illustrating a configuration of the holding unit 41. Here, for convenience of description, a state in which the holding unit 41 is seen through from above is illustrated. Further, in FIG. 2, for convenience, the scanning direction Ds and the transport direction Da when the holding unit 41 is assembled to the liquid discharging device 100 are illustrated.

As described above, the holding unit 41 includes the discharging unit 42 and the reading unit 46. The discharging unit 42 is constituted by a plurality of printing heads 44 arranged in the scanning direction Ds. Since configurations of the plurality of printing heads 44*a* to 44*d* are the same, they are referred to as "printing heads 44" when they do not need to be distinguished from each other.

Each of the printing heads 44 has a configuration in which a plurality of nozzle tips 45 are arranged in a staggered manner along the y-axis direction. "Nozzle tip 45" refers to a sintered body in which a plurality of nozzles 43 are formed. The plurality of nozzle tips 45 are combined to form one printing head 44, and the plurality of printing heads 44 are assembled to the lower surface of the holding unit 41. A first printing head 44*a* is a combination of four nozzle tips 45, and has two nozzle rows C1 and C2 in which the plurality of nozzles 43 are arranged in the y-axis direction. The nozzles 43 of a first nozzle row C1 are illustrated by white circles, and the nozzles 43 of a second nozzle row C2 are illustrated by black circles. The other printing heads 44*b* to 44*d* are also configured in the same manner as the first printing head 44*a*, and eight nozzle rows C1 to C8 are formed throughout the four printing heads 44*a* to 44*d*. From these eight nozzle rows C1 to C8, eight different kinds of color inks can be discharged as liquid.

Note that, in FIG. 2, only nine nozzles 43 for one row of one nozzle tip 45 are illustrated, but actually, the number of nozzles 43 for one row is several tens to several hundreds.

The reason why the plurality of nozzle tips 45 constituting one printing head 44 are arranged in a staggered manner is to arrange the nozzles 43 at a constant pitch along a direction perpendicular to the scanning direction Ds. Of the plurality of nozzles 43 constituting one nozzle row, a part of the nozzles 43 located at a position overlapping the scanning direction Ds serves as a dummy nozzle that is not used to discharge the liquid. Note that the configuration and arrangement of the printing head 44 illustrated in FIG. 2 is an example, and various other configurations and arrangements can be employed. For example, one nozzle tip 45 may constitute one printing head 44. Further, the discharging unit 42 is not constituted by the plurality of printing heads 44, and may be constituted by only one printing head 44.

In the first exemplary embodiment, the reading unit 46 is provided downstream in the scanning direction Ds with respect to the discharging unit 42. Further, the reading unit 46 is provided at a position aligned with downstream ends of the nozzle rows C1 to C8 in the transport direction Da, in the scanning direction Ds. Note that the attachment position of the reading unit 46 in the holding unit 41 is not limited thereto, and can be changed as appropriate.

Figure 3:
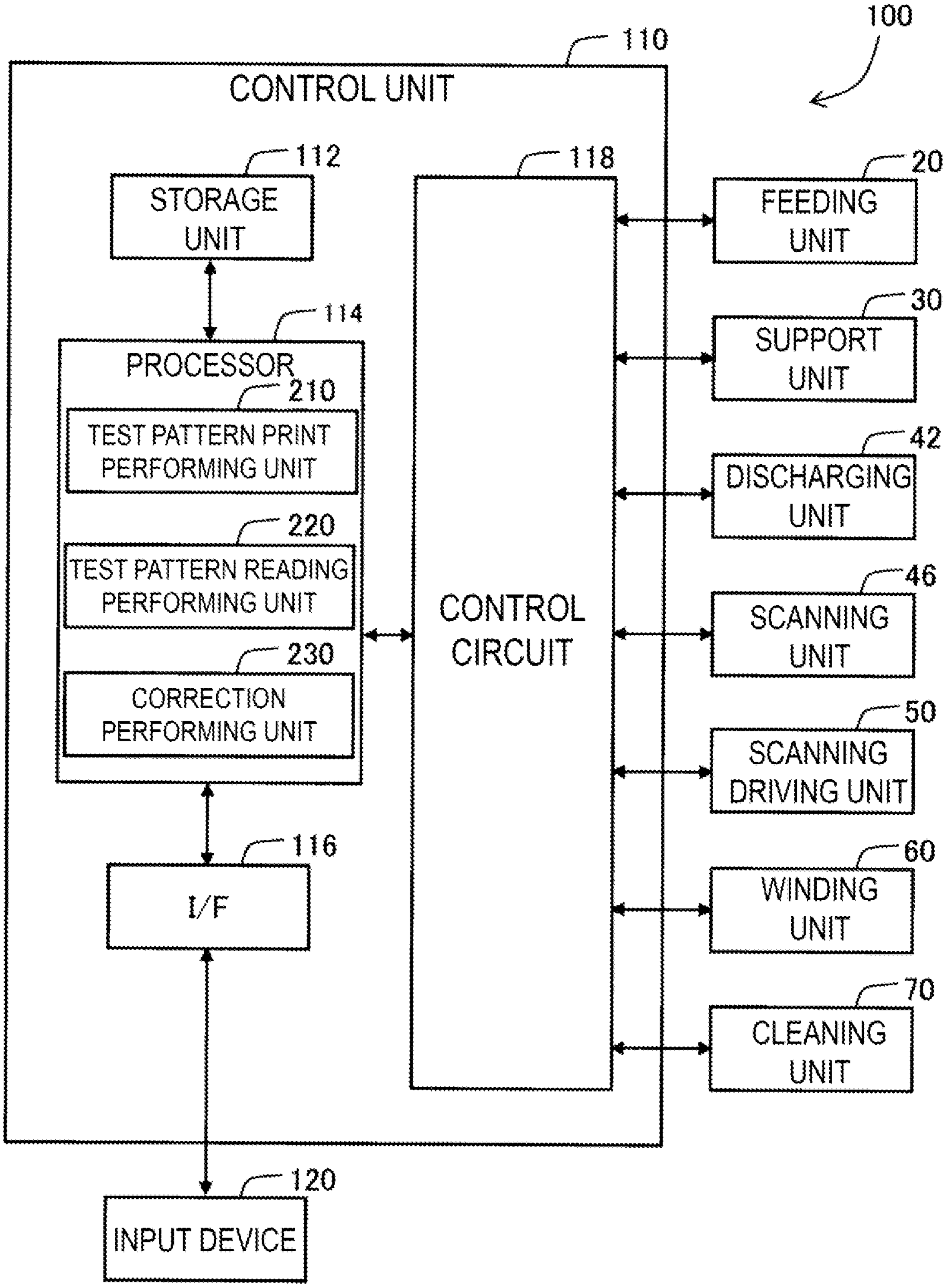
FIG. 3 is a functional block diagram of the liquid discharging device.

FIG. 3 is a functional block diagram of the liquid discharging device 100. The liquid discharging device 100 includes a control unit 110 and an input device 120. The control unit 110 includes a storage unit 112, a processor 114, an input-output interface 116, and a control circuit 118.

The processor 114 performs the control of each part illustrated in FIG. 1 via the control circuit 118. Further, the processor 114 has functions of a test pattern print performing unit 210, a test pattern reading performing unit 220, and a correction performing unit 230. The test pattern print performing unit 210 controls the operation of forming the test pattern image in the test pattern reading process described later. The test pattern reading performing unit 220 controls the operation of reading the test pattern image in the test pattern reading process described later.

The correction performing unit 230 performs a correction process that corrects conditions relating to the discharge of the liquid by the discharging unit 42 on the basis of the reading result in the test pattern reading process. In the first exemplary embodiment, as the condition relating to the discharge of the liquid, the discharge timing of the liquid from each nozzle 43 of the discharging unit 42 is corrected. This correction process is performed before printing based on the print data is started. The correction performing unit 230 corrects the discharge timing of the ink at the time of printing by using a correction value determined from the reading result of the test pattern image. The functions of each of these units are realized by executing a computer program stored in the storage unit 112. However, some or all of these functions may be realized by a hardware circuit.

The input device 120 is connected to the input-output interface 116 and supplies the print data to the control unit 110. The operator of the liquid discharging device 100 can use the input device 120 to instruct the performance of the correction process and input parameters used for calculating the correction value. In the first exemplary embodiment, the input device 120 is a part of the liquid discharging device 100, but the input device 120 may be configured by a device independent from the liquid discharging device 100. For example, a personal computer (PC) or the like capable of communicating with the liquid discharging device 100 may function as the input device.

Figure 4:
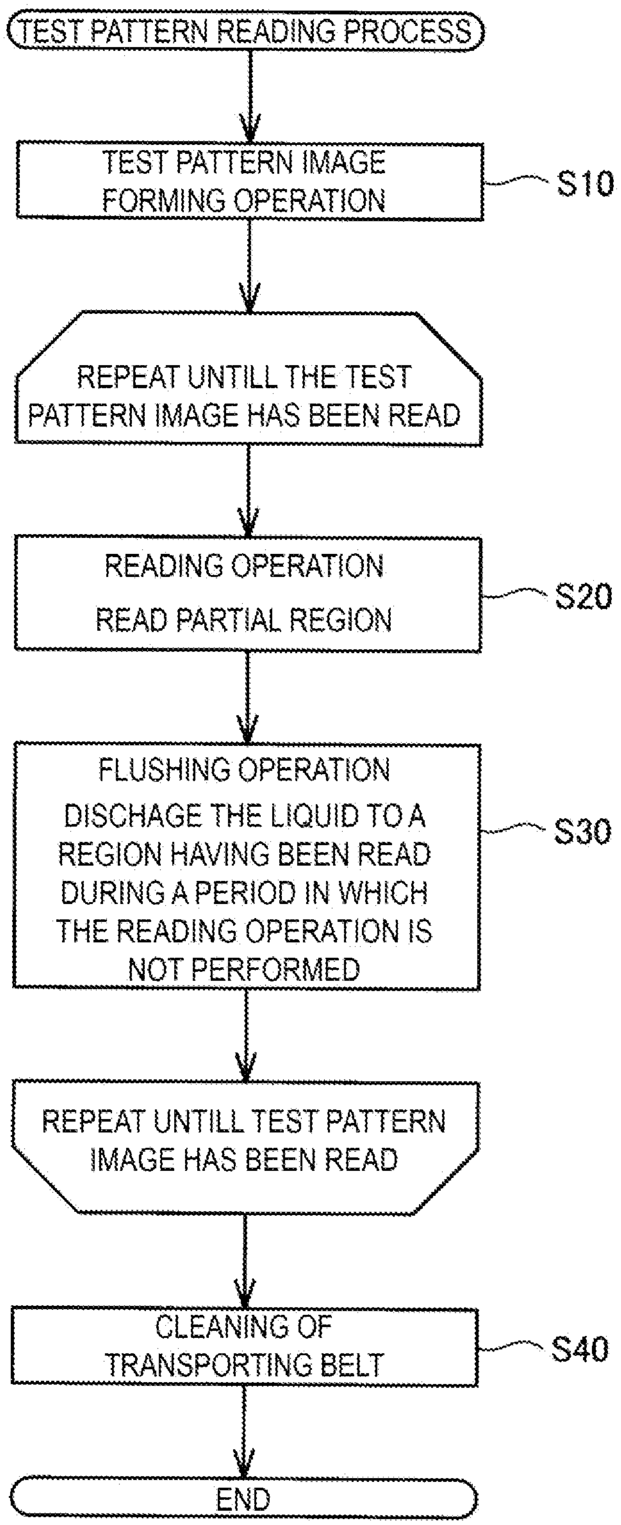
FIG. 4 is an explanatory diagram illustrating a flow of a test pattern reading process according to a first exemplary embodiment.

FIG. 4 is an explanatory diagram illustrating a flow of the test pattern reading process performed by the control unit 110 in the liquid discharging device 100. The test pattern reading process is performed, for example, in the correction process described above. Note that, in the first exemplary embodiment, the medium P in a strip shape is removed from the support unit 30 by the operator before starting the performance of the test pattern reading process, and a single paper for the test is set on the support surface 31*f* of the transporting belt 31 as the medium P supported by the support unit 30.

First, in step S10, by controlling the test pattern print performing unit 210, the liquid discharging device 100 performs the operation of forming the test pattern image on the medium P. The support unit 30 moves in the transport direction Da and the discharging unit 42 discharges the liquid while moving in the forward direction or the return direction based on the data representing the test pattern image previously stored in the non-volatile manner, thereby forming the test pattern image.

Figure 5:
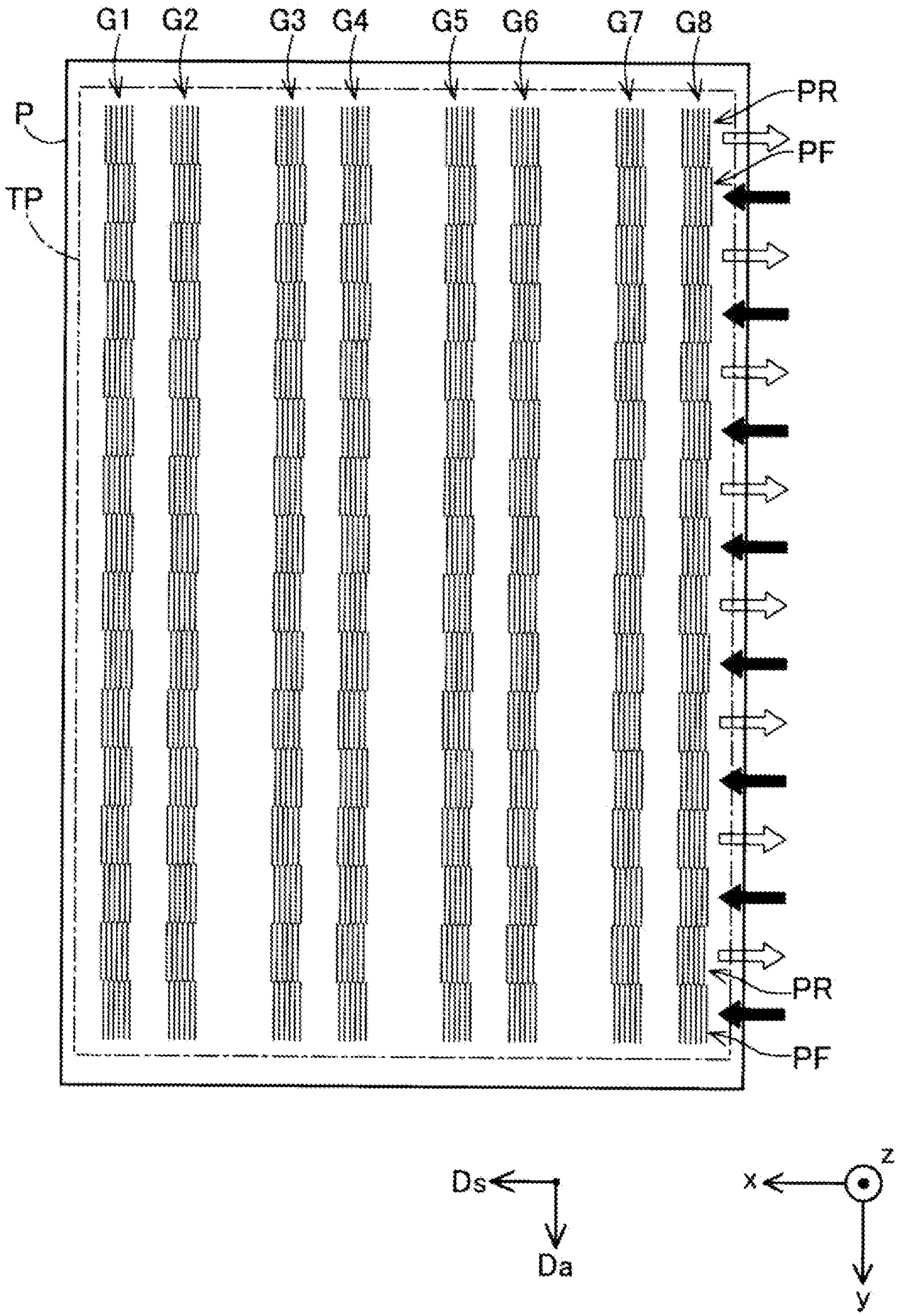
FIG. 5 is a schematic view illustrating an example of a test pattern image.

FIG. 5 is a schematic view illustrating an example of a test pattern image TP formed on the medium P. The test pattern image TP is for detecting a deviation between the discharge timings of the liquid during forward printing and the return printing, in bi-directional printing that alternately performs the forward printing and return printing to form an image. The test pattern image TP is constituted by straight-line groups G1 to G8 for each color ink formed with the liquid discharged from the nozzles 43 of each of the nozzle rows C1 to C8. Each of the straight-line groups G1 to G8 is constituted by a plurality of parallel straight lines along the transport direction Da. Further, forward regions PF formed by the forward printing and return regions PR formed by the return printing are arranged alternately in the transport direction Da with almost no gap, in each of the straight-line groups G1 to G8. In FIG. 5, the forward regions PF of each of the straight-line groups G1 to G8 are arranged in the x-axis direction at positions of a black arrow indicating the forward direction, and the return regions PR of each of the straight-line groups G1 to G8 are arranged in the x-axis direction at positions of a white arrow indicating the return direction. In the test pattern image TP, the amount of the position deviation in the scanning direction Ds between the straight line in the forward region PF and the corresponding straight line in the return region PR, indicates the amount of deviation of the discharge timing of the liquid between the forward printing and the return printing.

Next, by the control of the test pattern reading performing unit 220, reading operation of step S20 and flushing operation of step S30 are alternately repeated until the scan of the entire test pattern image TP is completed. In the first exemplary embodiment, the reading operation of the step S20 is operation of causing the reading unit 46 to read a partial region of the test pattern image TP. The test pattern reading performing unit 220 repeats the reading operation in the step S20 while moving the reading unit 46 with respect to the test pattern image TP of the medium P in a predetermined path described later, thereby reading the test pattern image TP for each of a plurality of divided regions.

The flushing operation of the step S30 is operation of causing the discharging unit 42 to perform flushing. In the flushing operation, liquid is discharged from all the nozzles of the discharging unit 42. The flushing operation in the step S30 is performed at a predetermined timing while the reading operation in the step S20 is repeated. In the flushing operation of the step S30, the test pattern reading performing unit 220 causes the discharging unit 42 to discharge the liquid to a region in the test pattern image TP read by the reading unit 46. Further, in the first exemplary embodiment, the flushing operation of the step S30 is performed during a period in which the reading operation of the step S20 is not performed so that the performance period thereof does not overlap with the performance period of the reading operation of the step S20.

Figure 6:
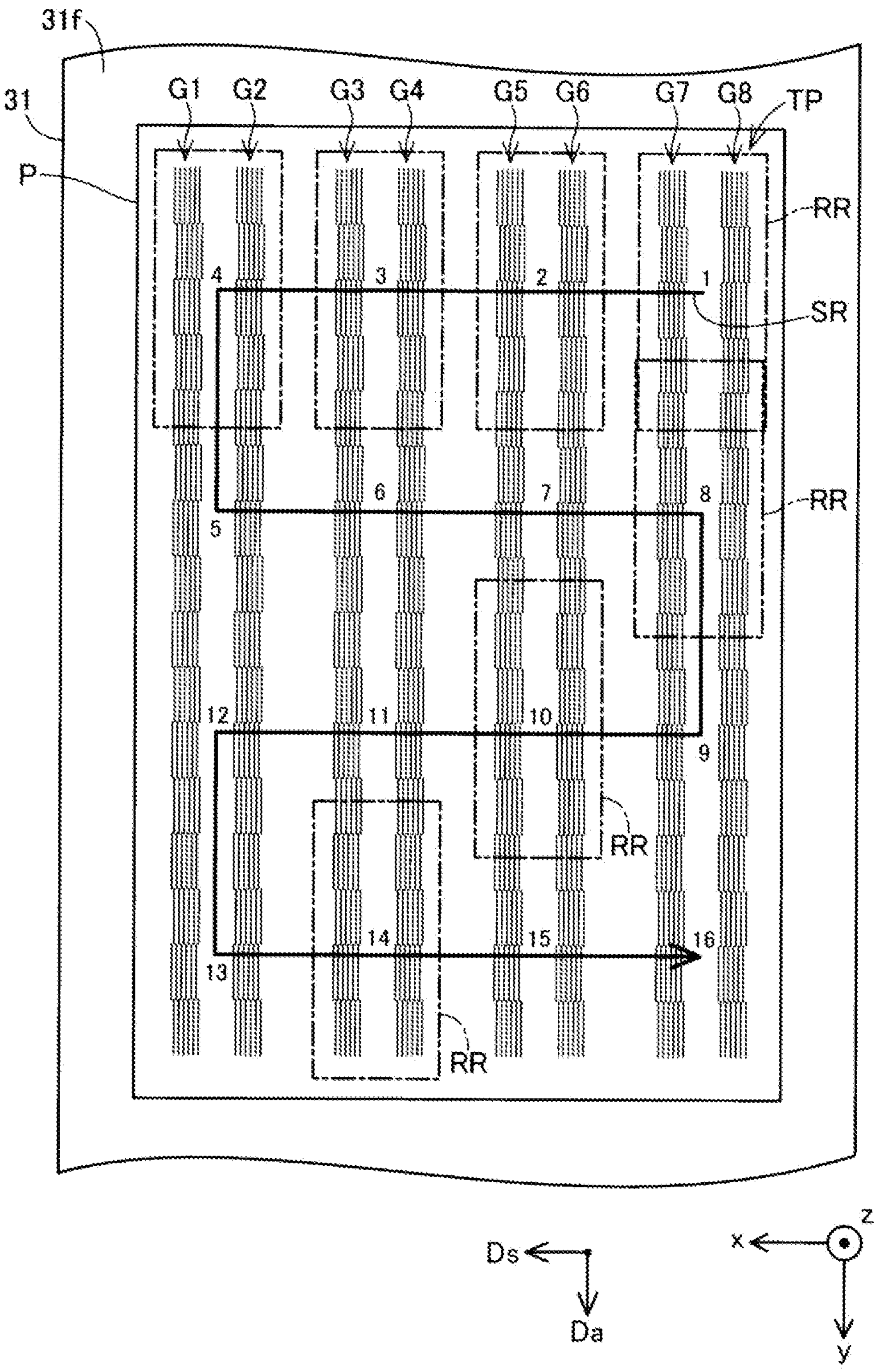
FIG. 6 is a schematic view illustrating an example of a movement path of a reading unit.

FIG. 6 is a schematic diagram illustrating an example of a movement path of the reading unit 46 when reading the test pattern image TP. In FIG. 6, a movement path SR of the reading unit 46 is illustrated by an arrow, and a reading range RR indicating the range in which the reading unit 46 can read at one time is illustrated by a chain line. A region corresponding to the reading area RR is also referred to as a "unit reading region". The numbers displayed along the movement path SR indicates positions at which the reading unit 46 performs reading and the order thereof. Note that the illustration of a part of the reading range RR in the middle of the movement path SR is omitted for convenience.

The test pattern reading performing unit 220 alternately repeats, scanning the reading unit 46 in the scanning direction Ds or the reverse direction thereof and moving the medium P by the support unit 30 in the reverse direction of the transport direction Da, and causes the reading unit 46 to read the test pattern image TP at a plurality of predetermined locations. In the example of FIG. 6, operation in which the test pattern image TP is read at four locations for each movement of the reading unit 46 in the scanning direction Ds or the reverse direction, and then the medium P is transported in the reverse direction of the transport direction Da, is repeated. Further, in the example of FIG. 6, a part of the reading ranges RR adjacent to each other in the y-axis direction is overlapped so as to cover the entire straight-line groups G1 to G8. Depending on the type of test pattern image TP, such overlapping of reading ranges RR may be omitted, or reading operation in which a part of reading ranges RR adjacent to each other in the x-axis direction is overlapped may be performed.

Figure 7:
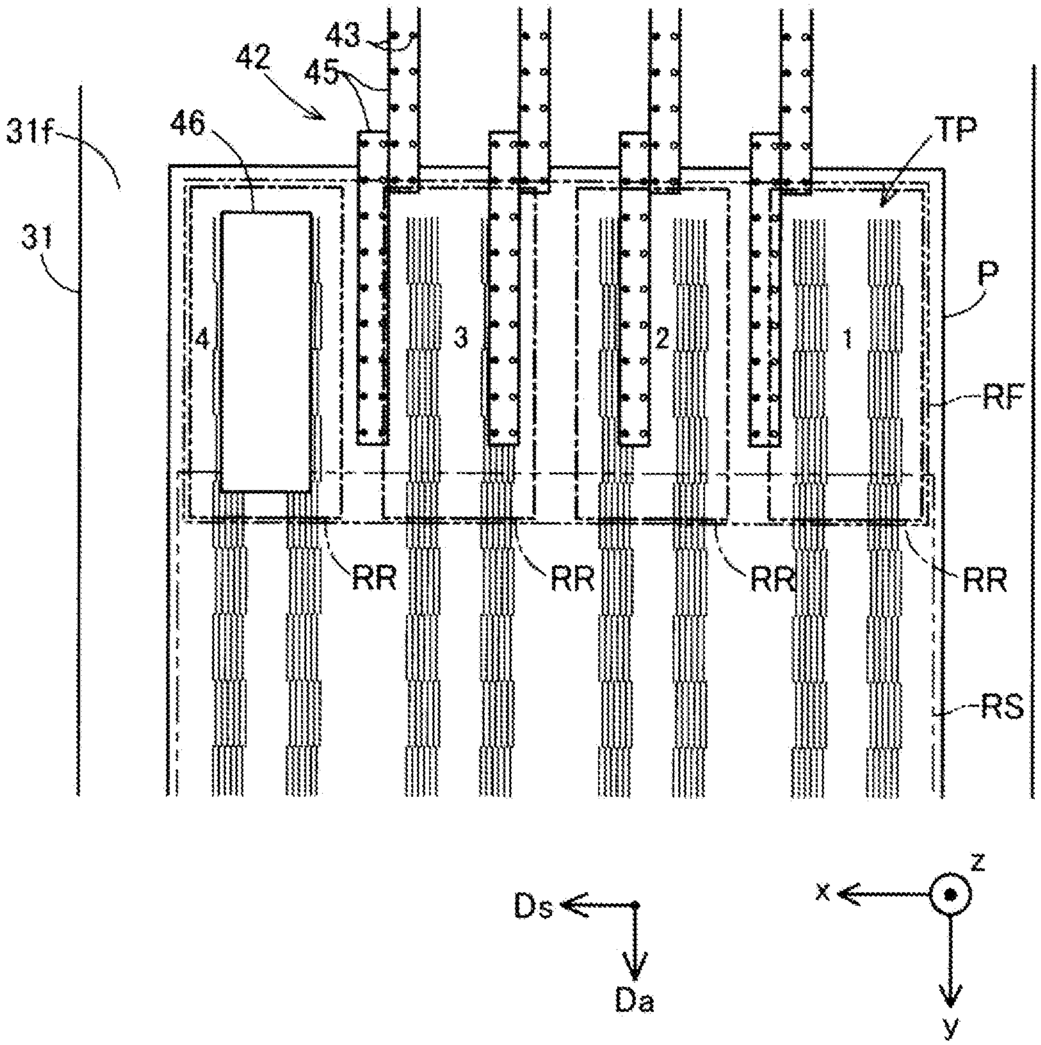
FIG. 7 is a first schematic view illustrating positions of the reading unit and the discharging unit when flushing operation is performed.
Figure 8:
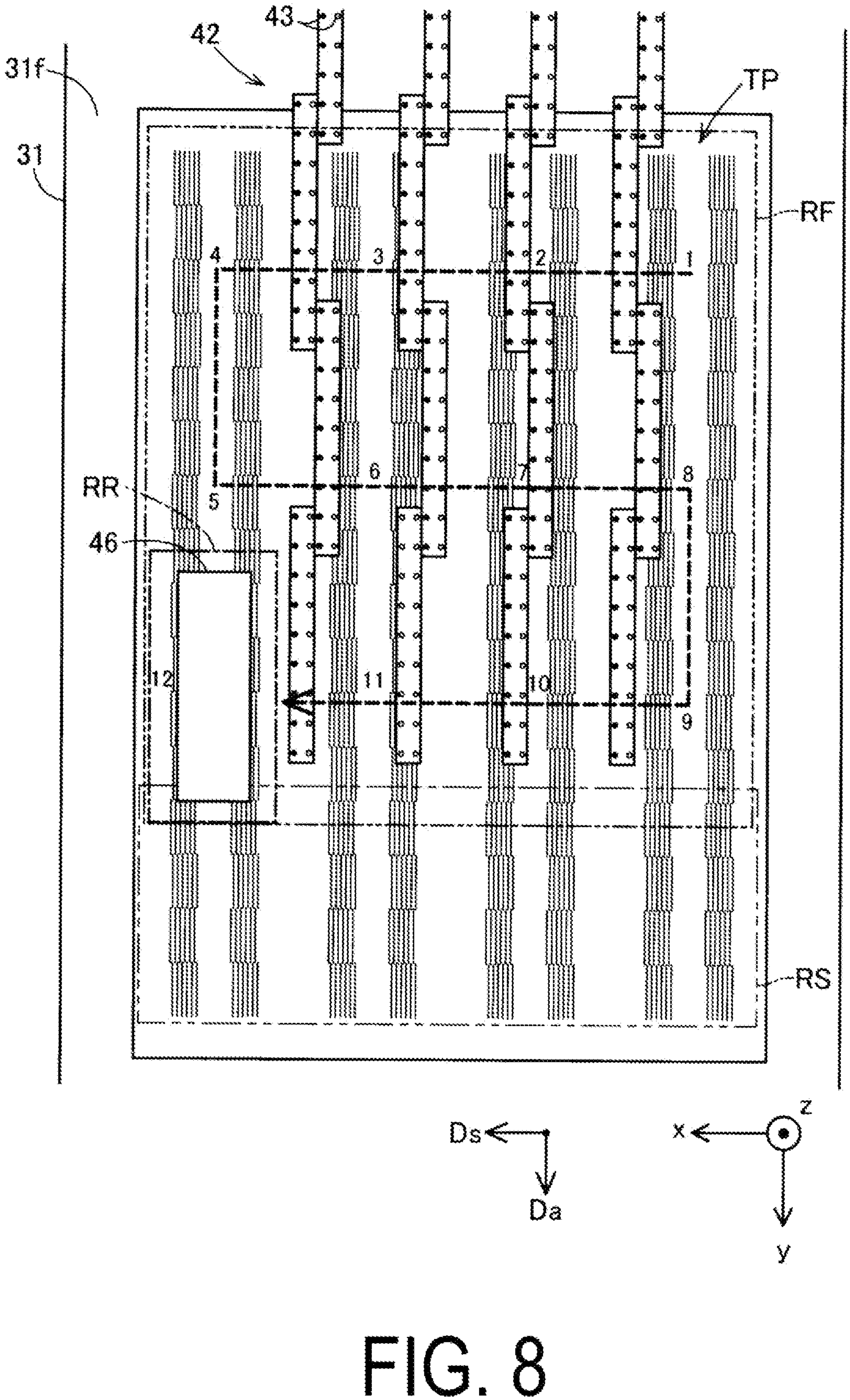
FIG. 8 is a second schematic view illustrating the positions of the reading unit and the discharging unit when the flushing operation is performed.

Referring to FIGS. 7 and 8, the timing at which the flushing operation of the step S30 is performed will be described. Each of FIGS. 7 and 8 illustrates the position of the reading unit 46 and the position of the discharging unit 42 when the flushing operation is performed. FIG. 7 illustrates a state in which the first scan in the scanning direction Ds is completed by the reading unit 46, and FIG. 8 illustrates a state in which the second scan in the scanning direction Ds is completed by the reading unit 46.

In the first exemplary embodiment, after the region corresponding to the plurality of reading ranges RR has been read by one reading operation, the flushing operation of the step S30 is performed when at least a part of the nozzle 43 of the discharging unit 42 is located at the region of the test pattern image TP that has been read. In the example of FIG. 7, after the reading operation at the first to fourth reading ranges RR is performed, the discharging unit 42 performs flushing in a state where the reading unit 46 is located at the region corresponding to the fourth reading range RR, which is the most downstream of the test pattern image TP in the scanning direction Ds. Further, in the example of FIG. 8, after the reading operation at the first to twelfth reading ranges RR is performed, the discharging unit 42 performs flushing in a state where the reading unit 46 is located at the region corresponding to the twelfth reading range RR, which is the most downstream of the test pattern image TP in the scanning direction Ds.

As described above, in the first exemplary embodiment, the reading unit 46 is provided downstream in the scanning direction Ds with respect to the discharging unit 42. Further, the reading unit 46 is provided at a position aligned with the downstream ends of the nozzle rows C1 to C8 in the transport direction Da, in the scanning direction Ds. Therefore, as illustrated in FIGS. 7 and 8, when one scan in the scanning direction Ds with respect to the test pattern image TP by the reading unit 46 is completed, at least a part of the nozzle 43 of the discharging unit 42 is positioned above the test pattern image TP that has been read. Each time one scan in the scanning direction Ds is completed, the test pattern reading performing unit 220 performs the flushing operation of the step S30 before transporting the medium P in the reverse direction of the transport direction Da.

In step S40, the test pattern reading performing unit 220 cleans the support surface 31*f* of the transporting belt 31 from which the medium P has been removed, by the cleaning unit 70. In the flushing operation of the step S30, when a part of the discharging unit 42 protrudes from the medium P because there is not a sufficient margin on the outer circumference of the test pattern image TP, the liquid is discharged to the region on the transporting belt 31 where the medium P is not disposed. For example, in the state illustrated in FIG. 7, since a part of the discharging unit 42 protrudes upstream in the transport direction Da than the medium P, the liquid discharged from the protrusion portion of the discharging unit 42 is discharged onto the transporting belt 31. Even in such a case, if the liquid discharging device 100 is provided with the cleaning unit 70, the liquid attached to the transporting belt 31 by the flushing can be removed by the cleaning performed by the cleaning unit 70.

As described above, the test pattern reading process of the first exemplary embodiment is completed. After performing the test pattern reading process, the correction performing unit 230 performs correction of the discharge timing of the liquid by the discharging unit 42 on the basis of the reading result of the test pattern image TP by the reading unit 46. The correction performing unit 230 detects, for example, the amount of the position deviation between the straight line in the forward region PF and the straight line in the return region PR, and calculates a correction amount of the discharge timing for eliminating the position deviation.

According to the liquid discharging device 100 of the first exemplary embodiment, in the test pattern reading process, the flushing operation of the step S30 is performed at a predetermined timing while the reading operation of the step S20 by the reading unit 46 is repeated. Therefore, it is suppressed that the liquid in the nozzle 43 dries and the nozzle 43 is clogged while the reading unit 46 is reading the test pattern image TP, and thus after the test pattern reading process is performed, the occurrence of a discharging defect of the liquid at the discharging unit 42 is suppressed. Further, the flushing operation of the step S30 is performed on the test pattern image TP having been read by the reading unit 46, without moving the discharging unit 42 to the liquid receiving unit 56. As a result, the movement of the discharging unit 42 for the flushing can be omitted, and thus energy and time required for the movement thereof can be saved, which is efficient. Further, according to the liquid discharging device 100 of the first exemplary embodiment, the operator can visually recognize how far the test pattern image TP has been read by the reading unit 46 by visually recognizing the trace of the flushing formed on the test pattern image TP. Specifically, the operator can determine that the test pattern image TP, which is partially filled with the liquid discharged by the flushing, has been read by the reading unit 46.

Here, the reading operation performed before the flushing operation is performed is referred to as a "first reading operation", and the reading operation performed by the reading unit 46 after the flushing operation is performed is referred to as a “second reading operation”. Further, in the test pattern image TP, a region read by the first reading operation by the reading unit 46 is referred to as a “first region RF”, and a region read by the second reading operation by the reading unit 46 is referred to as a “second region RS”. The first region RF and the second region RS correspond to regions scanned by the reading unit 46, and when there is a gap between the adjacent reading ranges RR, the first region RF and the second region RS also include the region of the gap. FIGS. 7 and 8 illustrate the first region RF and the second region RS. Under this definition, the process of repeating the operations of steps S20 to S30 of the first exemplary embodiment, can be interpreted as a process for performing the flushing operation in which the liquid is discharged to the first region RF during the period in which the reading operation is not performed after the first reading operation is performed. In this manner, in the test pattern reading process of the first exemplary embodiment, the reading operation by the reading unit 46 and the flushing operation of the discharging unit 42 are not performed in an overlapping period. Therefore, it is suppressed that mist and vibration caused by the flushing of the discharging unit 42 inhibit the reading operation of the reading unit 46.

In the first exemplary embodiment, the test pattern reading performing unit 220 causes the reading unit 46 to read the region corresponding to a plurality of reading ranges RR in the test pattern image TP by one reading operation, and then causes the discharging unit 42 to perform the flushing operation. In other words, the test pattern reading performing unit 220 causes the reading unit 46 to read a plurality of unit reading regions in one reading operation, and then causes the discharging unit 42 to perform the flushing operation. As a result, the frequency of performing the flushing operation by the discharging unit 42 is reduced with respect to the frequency of the reading operation by the reading unit 46. Therefore, the performance time of the test pattern reading process can be shortened, and the amount of the liquid consumed by the flushing operation can be reduced.

In the first exemplary embodiment, after the test pattern image TP has been read, the transporting belt 31 supporting the medium P is cleaned by the cleaning unit 70. As a result, the liquid attached to the transporting belt 31 by the flushing performed in the test pattern reading process is removed by the cleaning unit 70, and therefore, it is suppressed that such liquid adheres to the medium P on which printing is subsequently performed.

2. Second Exemplary Embodiment

Figure 9:
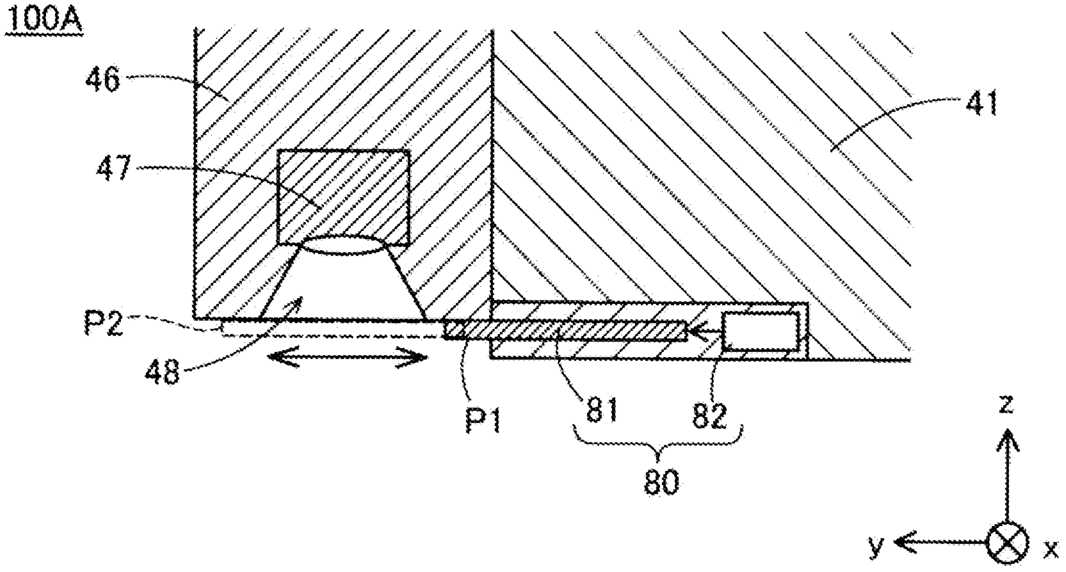
FIG. 9 is a schematic view illustrating a configuration of a shutter mechanism included in the liquid discharging device of a second exemplary embodiment.

FIG. 9 is a schematic cross-sectional view illustrating a configuration of the reading unit 46 included in a liquid discharging device 100A of a second exemplary embodiment. FIG. 9 illustrates a cutting plane including an optical axis of a camera 47 of the reading unit 46 and parallel to the z-axis direction and the y-axis direction. The configuration of the liquid discharging device 100*a* of the second exemplary embodiment is substantially the same as the configuration of the liquid discharging device 100 of the first exemplary embodiment, except that a shutter mechanism 80 is provided at the reading unit 46. The liquid discharging device 100*a* of the second exemplary embodiment performs the test pattern image reading process in the same manner as described in the first exemplary embodiment.

As described in the first exemplary embodiment, the reading unit 46 includes the camera 47 that captures an image formed on the printing surface of the medium P. The camera 47 includes a light-receiving unit 48 that receives reflected light reflected by the medium P. The shutter mechanism 80 is a mechanism that exposes or covers the light-receiving unit 48 by opening and closing a shutter 81. The shutter mechanism 80 includes the above-described shutter 81 and a driving mechanism 82 that drives the shutter 81. The shutter 81 is constituted by a plate-shaped member. The driving mechanism 82 is configured by, for example, a solenoid or the like. Under the control of the control unit 110, the driving mechanism 82 moves the shutter 81 to an open position P1 that exposes the light-receiving unit 48 to the medium P and a closed position P2 that covers the light-receiving unit 48 to the medium P. In FIG. 9, for convenience, the shutter 81 is illustrated by a dashed line when positioned at the closed position P2.

In the test pattern reading process, the test pattern reading performing unit 220 locates the shutter 81 at the open position P1 while the reading unit 46 is performing the reading operation. Further, the shutter 81 is located at the closed position P2 while the flushing operation of the step S30 is performed. As a result, it is suppressed that the mist caused during the flushing attaches to the light-receiving unit 48 and the reading accuracy of the image by the reading unit 46 deteriorates.

In addition, according to the method of reading the test pattern image TP achieved in the liquid discharging device 100*a* and the test pattern reading process of the second exemplary embodiment, various effects similar to those described in the first exemplary embodiment can be obtained.

3. Third Exemplary Embodiment

Figure 10:
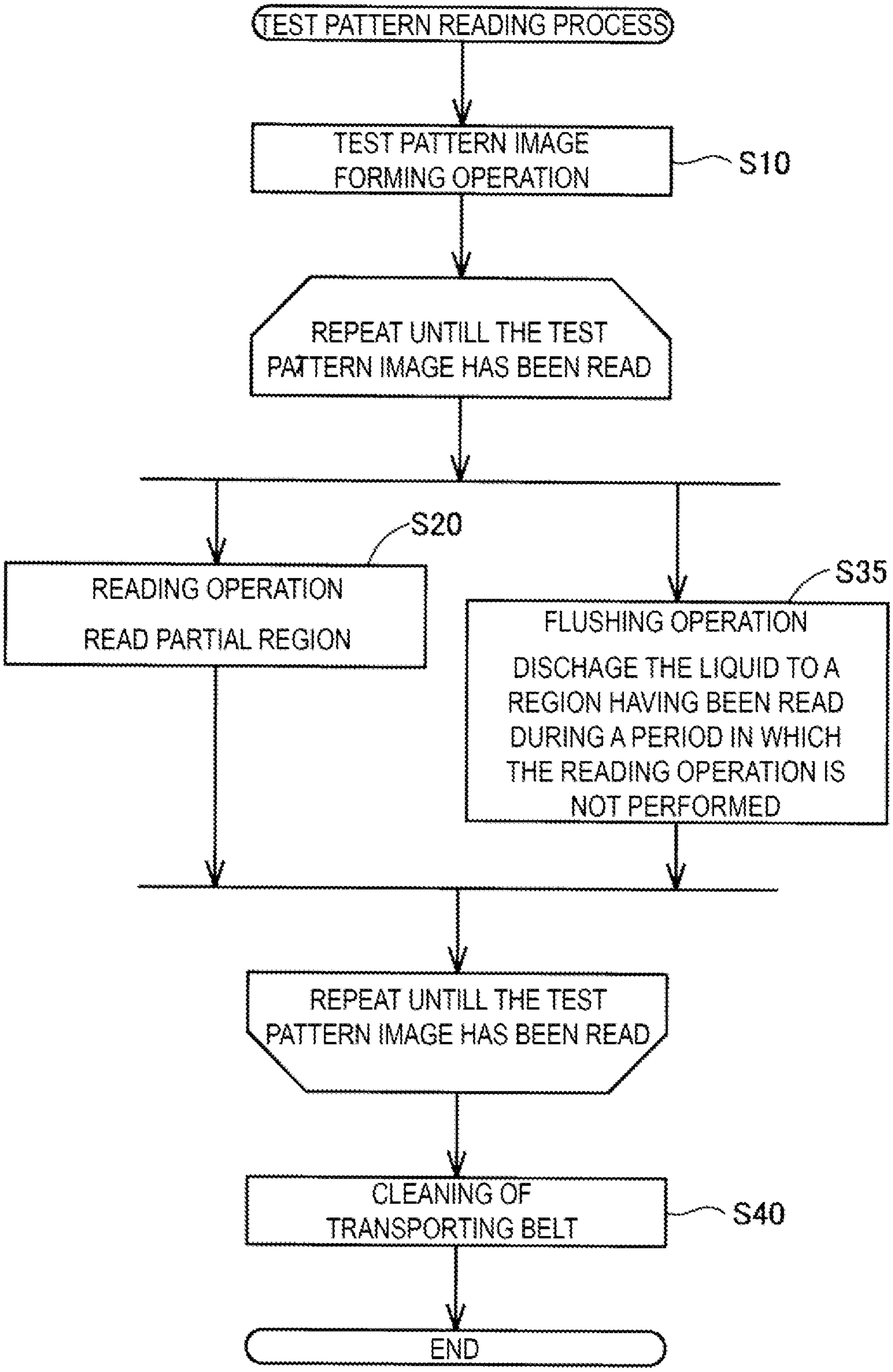
FIG. 10 is an explanatory diagram illustrating a flow of a test pattern reading process according to a third exemplary embodiment.

FIG. 10 is an explanatory diagram illustrating a flow of a test pattern reading process according to a third exemplary embodiment. The test pattern reading process of the third exemplary embodiment is substantially the same as the test pattern reading process of the first exemplary embodiment, except that instead of the flushing operation of the step S30, the test pattern reading process of step S35 is included. The test pattern reading process of the third exemplary embodiment is performed in the liquid discharging device 100 having the same configuration as that described in the first exemplary embodiment.

In the test pattern reading process of the third exemplary embodiment, the flushing operation of the step S35 is performed in parallel with the reading operation of the step S20. In the flushing operation of step S35, while the reading unit 46 is performing the reading operation of the step S20, the discharging unit 42 discharges liquid with respect to a partial region of the test pattern image TP in which the reading unit 46 has finished reading.

Figure 11:
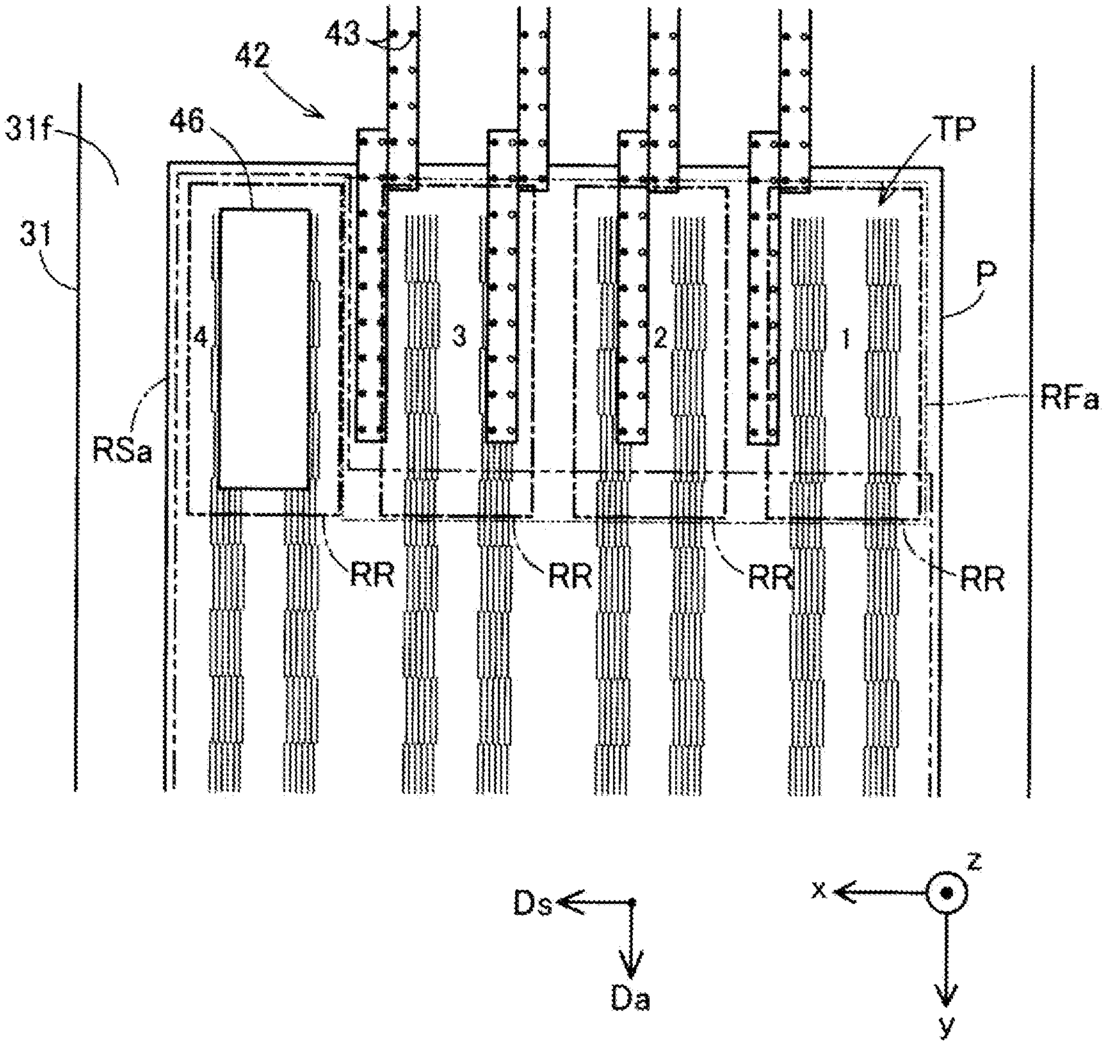
FIG. 11 is a first schematic diagram illustrating a position where reading operation and the flushing operation are executed in parallel.
Figure 12:
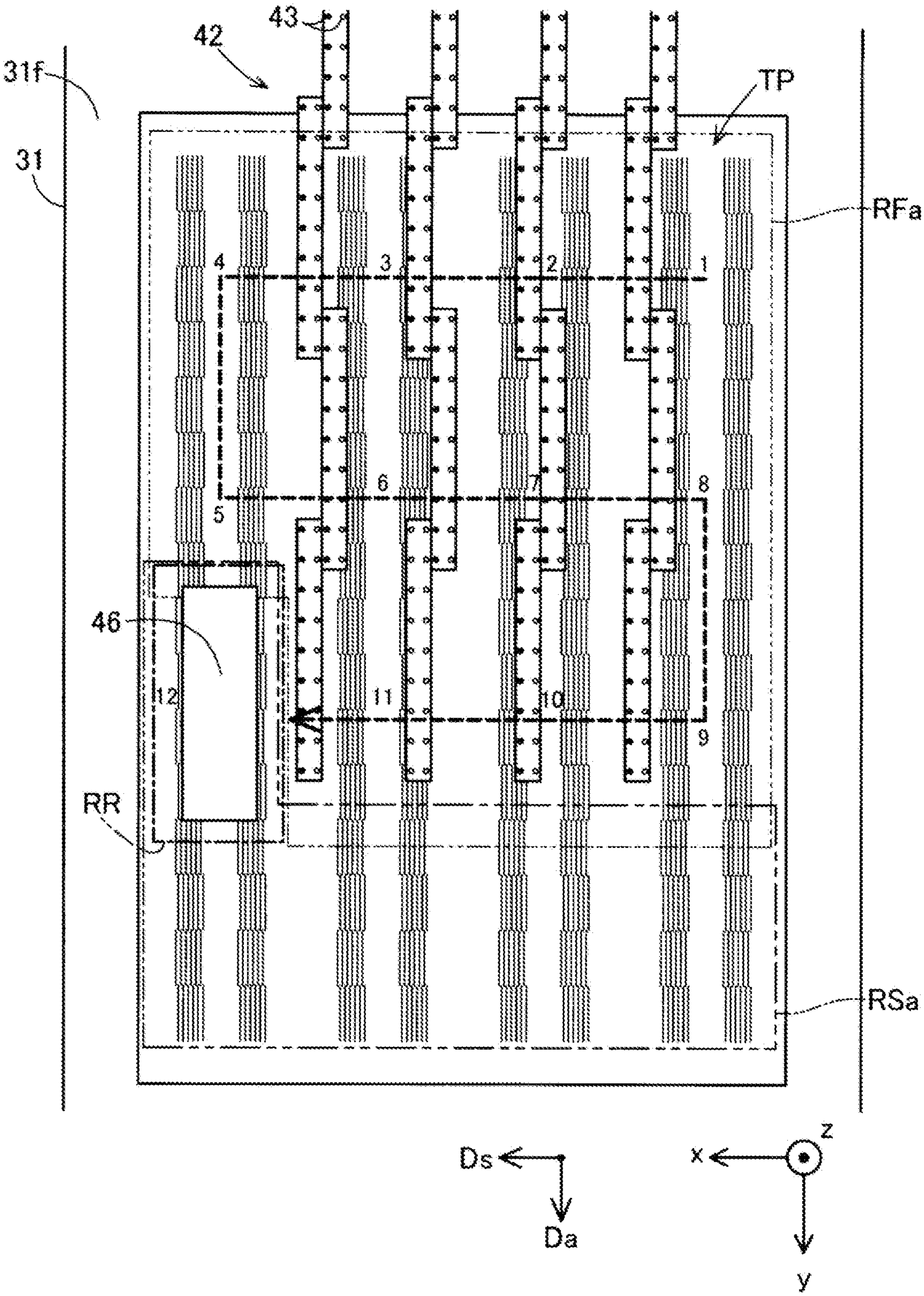
FIG. 12 is a second schematic diagram illustrating the position where the reading operation and the flushing operation are executed in parallel.

With reference to FIGS. 11 and 12, an example of the positions of the reading unit 46 and the discharging unit 42 when the reading operation of the step S20 and the flushing operation of the step S35 are performed in parallel. FIG. 11 illustrates when the reading unit 46 is performing the reading operation in the fourth reading range RR, after performing the reading operation in the first to third reading ranges RR. The discharging unit 42 performs the flushing operation for discharging the liquid to the region of the test pattern image TP read, while the reading unit 46 is performing the reading operation to the fourth reading range RR.

FIG. 12 illustrates when the reading unit 46 performs the reading operation in the twelfth reading range RR after performing the reading operation in the first to eleventh reading ranges RR. The discharging unit 42 performs the flushing operation for discharging the liquid to the region of the test pattern image TP read, while the reading unit 46 is performing the reading operation to the twelfth reading range RR. As described above, in the examples of FIGS. 11 and 12, when the reading unit 46 is reading the reading range RR located at the downstream end of the test pattern image TP in the scanning direction Ds, the ejection unit 42 is performing the flushing operation.

Note that in the test pattern reading process of the third exemplary embodiment, the gap between the holding unit 41 and the medium P may be set larger than that when the printing process is performed by the gap adjustment mechanism 51, in order to suppress the adhesion of the mist to the reading unit 46 due to the flushing operation. If the gap between the holding unit 41 and the medium P becomes large, the landing accuracy of the liquid discharged from the discharging unit 42 decreases, but in the flushing, the landing accuracy is not required as much, so that it is possible to make the gap between the holding unit 41 and the medium P relatively large.

Here, in the third exemplary embodiment, the reading operation performed before the flushing operation is performed is referred to as a "first reading operation", and the reading operation performed by the reading unit 46 while the flashing operation is performed is referred to as a "second reading operation". Further, in the test pattern image TP, a region read by the first reading operation by the reading unit 46 is referred to as a "first region RFa", and a region read by the second reading operation by the reading unit 46 is referred to as a "second region RSa". The first region RFa and the second region RSa correspond to regions scanned by the reading unit 46, and when there is a gap between the adjacent reading ranges RR, the first region RFa and the second region RSa also include the region of the gap. In the example of FIG. 11, the first region RFa corresponds to the region including the first to third reading ranges RR, and the second region RSa corresponds to the fourth reading range RR. Further, in the example of FIG. 12, the first region RFa corresponds to the region including the first to eleventh reading ranges RR, and the second region RSa corresponds to the twelfth reading range RR. Under this definition, in the test pattern reading process of the third exemplary embodiment, it can be interpreted that, in the flushing operation of the step S35, while the reading unit 46 is performing the second reading operation, the discharging unit 42 discharges liquid to the region including the first region RFa read by the reading unit 46, before the performance of the second reading operation is started in the test pattern image TP.

In this manner, in the test pattern reading process of the third exemplary embodiment, since the reading operation by the reading unit 46 and the flushing operation of the discharging unit 42 are performed in an overlapping period, the processing time of the test pattern reading process can be shortened. In addition, according to the method of reading the test pattern image TP achieved in the liquid discharging device and the test pattern reading process of the third exemplary embodiment, various effects similar to those described in the first exemplary embodiment can be obtained.

4. Other Embodiments

The various configurations described in the exemplary embodiments can described above be modified as describe below, for example. Any of other exemplary embodiments described below is regarded as an example for carrying out the technique of the present disclosure similarly to the exemplary embodiments described above.

(1) Other Exemplary Embodiment 1

In each of the above-described embodiments, the test pattern image TP may be constituted by an image that includes a test pattern other than that illustrated in FIG. 5. The test pattern image TP may be an image including a pattern to be read by the reading unit 46. Therefore, the test pattern image TP is not limited to that for detecting a deviation between the discharge timings of the liquid during the forward printing and the return printing, as described in each of the above-described embodiments. The test pattern image TP may be an image for testing the landing position of the liquid on the medium P, or may be an image for testing the size of the liquid mark when landing on the medium P. Alternatively, the test pattern image TP may be an image for checking the color and density of the image formed by the discharge of the liquid. The test pattern image TP may be configured to check the reading accuracy of the image by the reading unit 46 and the transport speed of the medium P by the support unit 30.

(2) Other Exemplary Embodiment 2

In each of the above-described embodiments, the reading unit 46 may read the test pattern image TP by optical measures other than imaging by the camera. The reading unit 46 may detect the density of the test pattern image TP by, for example, a reflection-type optical sensor.

(3) Other Exemplary Embodiment 3

In the test pattern reading process of each of the above-described embodiments, the reading unit 46 may scan the test pattern image TP in a different path from that illustrated in FIG. 6. The reading unit 46 may perform the scan in order of the transport direction Da or the reverse direction thereof, for example. Further, the timing at which the flushing operation is performed is not limited to the timing exemplified in each of the above-described embodiments. For example, in the first exemplary embodiment, after the reading unit 46 has read the region corresponding to the ninth reading range RR illustrated in FIG. 6, the flushing operation may be performed in the region where the reading has finished, which includes the region corresponding to the ninth reading range RR, before starting to read the tenth reading range RR. Alternatively, in the third exemplary embodiment, when the reading unit 46 is reading the region corresponding to the tenth reading range RR illustrated in FIG. 6, the flushing operation may be performed to the region where the reading has finished, which includes the region corresponding to the ninth reading range RR, before starting to read the tenth reading range RR. Further, in the third exemplary embodiment, the flushing operation may be performed while the reading unit 46 is moving.

(4) Other Exemplary Embodiment 4

In the test pattern reading process of each of the above-described embodiments, one unit reading region may be read in one reading operation, and then the flushing operation may be performed. That is, in the test pattern reading process, every time the reading unit 46 performs the reading operation of the step S20 that reads one reading range RR, the discharging unit 42 may perform the flushing operation of the step S30. For example, in the configuration of first exemplary embodiment, after the reading unit 46 has read the first reading range RR and before starting to read the second reading range RR illustrated in FIG. 6, the discharging unit 42 may perform the flushing operation that discharge the liquid to the region corresponding to the first reading range RR. Alternatively, in the configuration of the third exemplary embodiment, when the reading unit 46 is reading the second reading range RR illustrated in FIG. 6, the flushing operation for discharging the liquid to the region of the first reading range RR may be performed. In this manner, the frequency of performing the flushing operation by the discharging unit 42 is increased with respect to the frequency of the reading operation by the reading unit 46. Therefore, when the liquid that is likely to generate nozzle clogging is used, the generation of nozzle clogging can be suppressed by performing such a process. Examples of the liquid that is likely to generate nozzle clogging include high-viscosity ink and the like.

(5) Other Exemplary Embodiment 5

In each of the above-described embodiments, the cleaning unit 70 may be omitted. In this case, the flushing operation may be performed after the discharging unit 42 is moved to a location where all the nozzles 43 are located on the test pattern image TP. Alternatively, as the medium P on which the test pattern image TP is formed, a medium having a size having a sufficient margin on the outer circumference of the test pattern image TP may be used, or a strip-shaped body transported by the transporting belt 31 may be used.

(6) Other Exemplary Embodiment 6

In each of the above-described embodiments, the support unit 30 is configured to transport the medium P by the transporting belt 31. On the other hand, the support unit 30 may not include the transporting belt 31 and may be configured to support the medium P at a fixed position.

(7) Other Exemplary Embodiment 7

The reading unit 46 may be configured to read the entire test pattern image TP by one reading operation. In this case, after one reading operation, the flushing operation for discharging the liquid to the test pattern image TP may be performed. The reading unit 46 may perform one flushing operation each time one reading operation is performed.

(8) Other Exemplary Embodiment 8

The test pattern reading process in each of the above-described embodiments may be performed in the liquid discharging device other than the printing apparatus. For example, the same procedure may be performed in a liquid discharging device that discharges a liquid adhesive to the medium.

5. Aspect Example

The present disclosure is not limited to each of the above-described embodiments and examples, and may be implemented in various aspects without departing from the spirits of the disclosure. For example, the technique of the present disclosure may be achieved through the following aspects. Appropriate replacements or combinations may be made to the technical features in each of the above-described embodiments which correspond to the technical features in the aspects described below to solve some or all of the problems to be achieved by the techniques of the disclosure or to achieve some or all of the advantageous effects to be achieved by the techniques of the disclosure. Additionally, when the technical features are not described herein as essential technical features, such technical features may be deleted appropriately.

(1) A first aspect is provided as a liquid discharging device. A liquid discharging device of this aspect includes a support unit configured to support a medium, a discharging unit configured to discharge liquid to the medium supported by the support unit, a reading unit configured to read an image formed on the medium with the liquid, a holding unit configured to hold the discharging unit and the reading unit while moving in a scanning direction, and a control unit configured to control operation of the discharging unit, the reading unit, and the holding unit. The control unit may be configured to perform pattern forming operation that causes the discharging unit to discharge the liquid to form a test pattern image on the medium, reading operation that causes the reading unit to read at least a partial region of the test pattern image, and flushing operation that causes the discharging unit to perform flushing for discharging the liquid to a region in the teat pattern image read by the reading unit.

According to the liquid discharging device of this aspect, flushing of the discharging unit can be performed without moving the discharging unit to a place away from the test pattern image. Therefore, it is possible to suppress clogging of the nozzle of the discharging unit while the test pattern image is read by the reading portion, and the time required for reading the test pattern image can be shortened.

(2) In the above-described aspect, when operation causing the reading unit to read a first region in the test pattern image TP by the reading operation is first reading operation, and operation causing the reading unit to read a second region in the test pattern image TP by the reading operation after the first reading operation is performed is second reading operation, the control unit may cause the discharging unit to perform the flushing operation for discharging the liquid to the first region during the period in which the reading operation is not performed after the first reading operation is performed.

According to the liquid discharging device of this aspect, it is suppressed that mist and vibration caused by the flushing of the discharging unit inhibit the reading operation of the reading unit.

(3) In the liquid discharging device according to the above-described aspect, the reading unit may include a light-receiving unit configured to receive light reflected by the medium, and a shutter configured to move to an open position where the light-receiving unit is exposed to the medium and a closed position where the light-receiving unit is covered against the medium, and the shutter may be located at the open position while the reading operation is performed, and the shutter may be located at the closed position while the flushing operation is performed.

According to the liquid discharging device of this aspect, it is suppressed that the mist caused during the flushing attaches to the light-receiving unit and the reading accuracy of the image by the reading unit deteriorates.

(4) In the liquid discharging device according to the above-described aspect, when operation causing the reading unit to read a first region in the test pattern image TP by the reading operation is first reading operation, and operation causing the reading unit to read a second region in the test pattern image TP by the reading operation after the first reading operation is performed is second reading operation, the control unit may cause the discharging unit to perform the flushing operation for discharging the liquid to the first region while the second reading operation is performed.

According to the liquid discharging device of this aspect, the reading of the test pattern image by the reading unit and the flushing of the discharging unit can be performed in parallel, so that the processing time required to read the test pattern image can be shortened.

(5) In the liquid discharging device according to the above-described aspect, when a region corresponding to a range the reading unit can read at one time is a unit reading region, the control unit may cause the reading unit to read a plurality of unit reading region in one reading operation, and then cause the discharging unit to perform the flushing operation.

According to the liquid discharging device of this aspect, the frequency of performing the flushing operation by the discharging unit can be reduced with respect to the frequency of the reading operation by the reading unit. Therefore, an increase in processing time and an increase in the amount of liquid consumption due to the performance of the flushing can be suppressed.

(6) In the liquid discharging device according to the above-described aspect, the support unit may include a transporting belt on which the medium is arranged and configured to transport the medium in a direction intersecting the scanning direction below the holding unit, and the liquid discharging device may further include a cleaning unit configured to clean the transporting belt.

According to the liquid discharging device of this aspect, the liquid attached to the transporting belt by flushing can be removed by the cleaning unit, so that the transporting belt can be prevented from being damaged.

The technique of the present disclosure may be embodied in various forms other than the liquid discharging device. For example, it can be embodied in forms of a method of causing the liquid discharging device to read a test pattern image, a flushing method in the liquid discharging device, a control method of the liquid discharging device, a control device of the liquid discharging device, and the like. Further, the present disclosure can be implemented in forms including a computer program for performing the above-described methods, and a non-transitory storage medium storing the computer program.

REFERENCE SIGNS LIST

20 . . . feeding unit, 21 . . . rotary shaft, 22 . . . driven roller, 30 . . . support unit, 31 . . . transporting belt, **31*f* . . . support face, 32 . . . driving roller, 33 . . . driven roller, 35 . . . pressing roller, 36 . . . belt support unit, 40 . . . discharge processing unit, 41 . . . holding unit, 42 . . . discharging unit, 43 . . . nozzle, 44, . . . 44*a* to 44*d* . . . printing head, 45 . . . nozzle tip, 46 . . . reading unit, 47 . . . camera, 48 . . . light-receiving unit, 50 . . . scanning driving unit, 51 . . . gap adjustment mechanism, 55 . . . cap unit, 56 . . . liquid receiving unit, 60 . . . winding unit, 61 . . . driven roller, 62 . . . winding shaft, 70 . . . cleaning unit, 73 . . . cleaning brush, 74 . . . tray, 80 . . . shutter mechanism, 81 . . . shutter, 82 . . . driving mechanism, 100 . . . liquid discharging device, 100*a* . . . liquid discharging device, 110 . . . control unit, 112 . . . storage unit, 114 . . . processor, 116 . . . input-output interface, 118 . . . control circuit, 120 . . . input device, 210 . . . test pattern print performing unit, 220 . . . test pattern reading performing unit, 230 . . . correction performing unit, C1 to C8 . . . nozzle row, Da transport direction, Dc rotation direction, Ds scanning direction, G1 to G8 . . . straight-line group, P medium, P1 . . . open position, P2 . . . closed position, PF . . . forward region, PR . . . return region, R1 . . . roll, R2** . . . roll, RF, RFa . . . first region, RS, RSa . . . second region, RR . . . reading range, SR . . . movement path, TP . . . test pattern image

The invention claimed is:

1. A liquid discharging device comprising:

a support unit configured to support a medium, a discharging unit configured to discharge liquid to the medium supported by the support unit, a reading unit configured to read an image formed on the medium with the liquid, a holding unit configured to hold the discharging unit and the reading unit while moving in a scanning direction, and a control unit configured to control operation of the discharging unit, the reading unit, and the holding unit, wherein the control unit is configured to perform pattern forming operation that causes the discharging unit to discharge the liquid to form a test pattern image on the medium, reading operation that causes the reading unit to read at least a partial region of the test pattern image, and flushing operation that causes the discharging unit to perform flushing for discharging the liquid to a region in the test pattern image read by the reading unit, wherein the reading operation is configured to perform:

a first moving operation that causes the reading unit to move in the scanning direction to read at least a partial region of the test pattern image, a second moving operation that causes the reading unit to move in an intersect direction that intersects the scanning direction, and the first moving operation and the second moving operation are alternately repeated, and wherein the flushing operation is performed during a period in which the reading operation is not performed.

2. The liquid discharging device according to claim 1, wherein when operation causing the reading unit to read a first region in the test pattern image by the reading operation is first reading operation, and operation causing the reading unit to read a second region in the test pattern image by the reading operation after the first reading operation is performed is second reading operation, the control unit causes the discharging unit to perform the flushing operation for discharging the liquid to the first region during a period, in which the reading operation is not performed, after the first reading operation is performed.

3. The liquid discharging device according to claim 1, wherein the reading unit includes a light-receiving unit configured to receive light reflected by the medium, and a shutter configured to move to an open position where the light-receiving unit is exposed to the medium and a closed position where the light-receiving unit is covered against the medium, and the shutter is located at the open position while the reading operation is performed, and the shutter is located at the closed position while the flushing operation is performed.

4. The liquid discharging device according to claim 1, wherein when operation causing the reading unit to read a first region in the test pattern image by the reading operation is first reading operation, and operation causing the reading unit to read a second region in the test pattern image by the reading operation after the first reading operation is performed is second reading operation, the control unit causes the discharging unit to perform the flushing operation for discharging the liquid to the first region while the second reading operation is performed.

5. The liquid discharging device according to claim 1, wherein when a region corresponding to a range that the reading unit is configured to read at one time is a unit reading region, the control unit reads a plurality of unit reading regions in one reading operation, and then performs the flushing operation.

6. The liquid discharging device according to, wherein the support unit includes a transporting belt at which the medium is arranged and configured to transport the medium in a direction intersecting the scanning direction below the holding unit, and the liquid discharging device further includes the cleaning unit configured to clean the transporting belt.

7. A method of causing a liquid discharging device to read a test pattern image, the liquid discharging device including a support unit configured to support a medium, a discharging unit configured to discharge liquid to the medium supported by the support unit, a reading unit configured to read an image formed on the medium with the liquid, a holding unit configured to hold the discharging unit and the reading unit while moving in a scanning direction, the method comprising:

performing a pattern forming operation that causes the discharging unit to discharge the liquid, thereby forming the test pattern image on the medium, performing a reading operation that causes the reading unit to read at least a partial region of the test pattern image, performing a flushing operation that causes the discharging unit to perform flushing for discharging the liquid to a region in the test pattern image read by the reading unit wherein the reading operation is configured to perform:

a first moving operation that causes the reading unit to move in the scanning direction to read at least a partial region of the test pattern image, a second moving operation that causes the reading unit to move in an intersect direction that intersects the scanning direction, and the first moving operation and the second moving operation are alternately repeated, and wherein the flushing operation is performed during a period in which the reading operation is not performed.

* * * * *